United States Patent [19]

Takahashi et al.

[11] Patent Number: 4,993,103
[45] Date of Patent: Feb. 19, 1991

[54] WIPER BLADE APPARATUS

[75] Inventors: Tsuyoshi Takahashi, Yokohama; Nobuo Matsumoto, Tokyo, both of Japan

[73] Assignees: Jidosha Denki Kogyo K.K., Yokohama; Metac Sangyo Co., Ltd., Tokyo, both of Japan

[21] Appl. No.: 435,871

[22] Filed: Nov. 14, 1989

[30] Foreign Application Priority Data

Nov. 17, 1988 [JP] Japan .............................. 63-150432[U]

[51] Int. Cl.⁵ .............................................. B60S 1/32
[52] U.S. Cl. ................................ 15/250.31; 15/250.36
[58] Field of Search ............ 15/250.42, 250.32, 250.31, 15/250.33

[56] References Cited

U.S. PATENT DOCUMENTS 3,153,254 10/1964 Lenz et al. .................... 15/250.42
3,626,544 9/1970 Lopez et al. .................. 15/250.42
3,879,794 4/1975 Roberts, Jr. .................. 15/250.42
3,885,265 5/1975 Deibel et al. ................. 15/250.42
4,156,951 6/1979 Sharp .............................. 15/250.42

FOREIGN PATENT DOCUMENTS 2338496 2/1975 Fed. Rep. of Germany ... 15/250.42

Primary Examiner—Harvey C. Hornsby
Assistant Examiner—P. F. Brinson
Attorney, Agent, or Firm—Sughrue, Mion, Zinn, Macpeak & Seas

[57] ABSTRACT

A wiper blade assembly includes a rubber blade, a vertebrae holding the rubber blade, a yoke for supporting the vertebrae and a connector having arms for engaging the vertebrae, the rubber blade and the yoke at a common point for connecting the assembly together. The arms have projecting portions secured in openings in the vertebra with each arm having an outwardly opening groove receiving an engaging portion of the yoke and inwardly directed serrations engaging opposite sides of the blade.

3 Claims, 4 Drawing Sheets 4,993,103

WIPER BLADE APPARATUS

BACKGROUND OF THE INVENTION

1. Field of The Invention

This invention relates to an wiper blade apparatus for wiping a wiped surface of a windshield or the like, for example, of an automobile, by sliding the blade rubber in contact with the wiped surface.

2. Description of The Prior Art

Heretofore, there has been used a wiper blade as shown in FIG. 4 to FIG. 6 for example.

Namely, a wiper blade apparatus 100 shown in figures is attached with connector 103 at either end of a vertebra 102 holding a blade rubber 101 which is in contact with a wiped surface (not shown) on a windshield or the like, and is attached to said connector 103 with a yoke 105 fitted to a blade lever L connected with a wiper are 104.

The blade rubber 101 is provided with a long shaped contact portion 101a in contact with the wiped surface (not shown) on the windshield or the like, and an insert portion 101b having a T-shaped cross section and inserted into the vertebra 102 on the upper side of said contact portion 101a in FIG. 5.

The vertebra 102 is provided with a hollow portion 102a for holding the insert portion 101b of the blade rubber 101 and an upper plate 102b on the upper side of the said hollow portion 102a in FIG. 5. And the vertebra 102 is provided with openings 102d piercing connecting plates 102c, 102c through in the horizonal direction in FIG. 6, as positions near to both ends thereof on the upper and lower side in FIG. 4.

The connector 103 is provided with a projection 103b raising upward from a base 103a at the lower side in FIG. 6 and fitting into the hollow portion 102a of the vertebra 102, and arms 103c protruding upward from the base 103a on both sides said projection 103b and having elasticity slightly in the right and left direction in FIG. 6. And the connector 103 is provided with said arms 103c including engaging parts 103d engaged with the openings 102d of the vertebra 102 respectively, and also with fitting parts 103e to be attached to the yoke 105.

Furthermore, the yoke 105 is provided to one end near to either end of the vertebra 102 with inlaying parts 105a which hold the upper plate 102b of the vertebra 102 slidably in its longitudinal direction by fitting into the fitting parts 103e provided to the connector 103 and are engaged with the connector 103 in which the engaging parts 103d are pressed onto the openings 102d of the vertebra 102, and provided with holding parts 105b which hold the upper plate 102b of the vertebra 102 slidably in its longitudinal direction at another end near to the center of the vertebra 102.

Thereby, engaging the engaging parts 103d provided to the arms 103c of the connector 103 with the openings 102d of the vertebra 102 after inserting the insert portion 101b provided to the blade rubber 101 into the hollow portion 102a, holding the vertebra 102 in the position near to the center by the holding parts 105b provided to the yoke 5, and fitting the inlaying parts 105a provided to the yoke 105 into the fitting parts 103e provided to the connector 103, the connector 103 is so structured as to be engaged with the yoke 105 in which the engaging part 103d provided to the connector are pressed onto the openings 102d provided to the vertebra 102.

However, in the above mentioned conventional wiper blade apparatus 100, the connector 103 is engaged with the vertebra 102 in a state of inserting the blade rubber 101 into the vertebra 102, and the yoke 105 is engaged with said connector 103. Therefore, because the blade rubber 101 is not fixed to the yoke 105 fitted to the blade lever L connected with the wiper arm 104, the blade rubber 101 sometimes moves in the vertebra 102 in the longitudinal direction and sometimes slips down from the vertebra 102. In such a case, there is a problem since it is impossible to wipe the wiped surface satisfactorily, and is therefore impossible to keep the field of view from the driver's seat in favorable state. Accordingly, it is damaged to use a wiper blade apparatus which is possible to hold the blade rubber 101 to the yoke 105 securely so as not to disconnect the blade rubber 101 from the vertebra 102 and possible to keep the field of view in favorable state for a long time when the wiped surface is wiped.

SUMMARY OF THE INVENTION

Therefore, since this invention is considered in order to solve the aforementioned problem of the prior art, it is an object of the invention to provide a wiper blade apparatus which is able to keep the field of view in favorable state for a long time by making the blade rubber not to disconnect from the vertebra and holding securely the blade rubber to the yoke.

The construction of the wiper blade apparatus according to this invention for attaining the above-mentioned object is characterized by having a blade rubber in contact with a wiped surface, a vertebra holding said blade rubber, a yoke fitted to a lever, and a connector attached to said yoke at an engaged state with said vertebra, said connector being provided with a blade rubber holder for engaging the vertebra and the blade rubber at a state in which the connector is attached to the yoke.

The wiper blade apparatus according to this invention has the blade rubber in contact with wiped surface, the vertebra holding said blade rubber, the yoke fitted to the lever and the connector attached to said yoke in an engaged state with said vertebra, the blade rubber holder provided to said connector is engagted with the vertebra and the blade rubber at a state in which the connector is attached to the yoke. Hereby, the wiper blade apparatus is so structured as not to disconnect the balde rubber from the vertebra, and the blade rubber is held securely by the yoke.

DESCRIPTION OF THE PREFERRED EMBODIMENTS

An embodiment of the wiper blade apparatus according to this invention will be described below on basis of FIG. 1 and FIG. 3.

Figure 4:
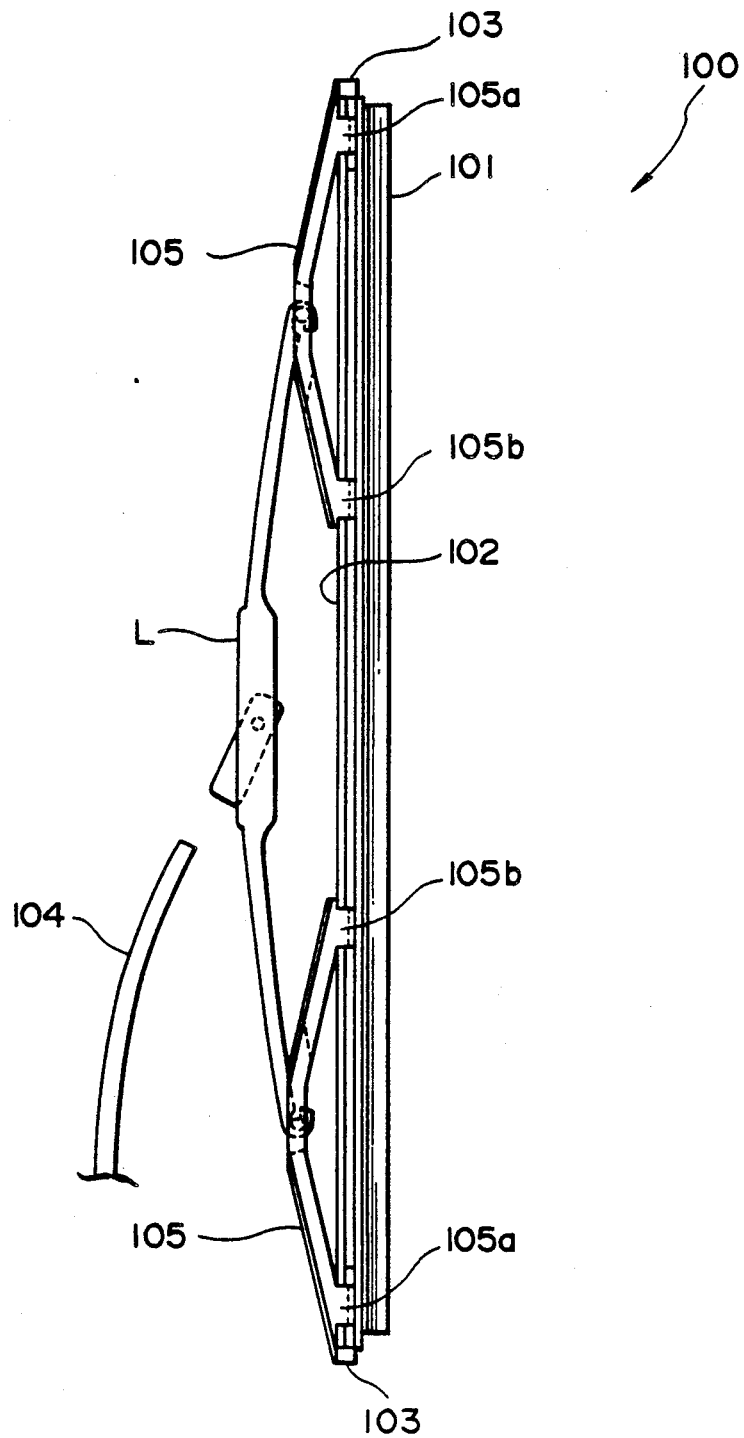
FIG. 4 is a side view of conventional wiper blade apparatus.
Figure 5:
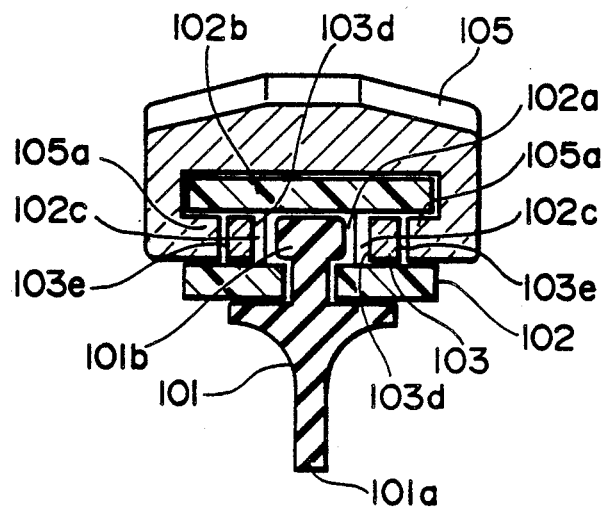
FIG. 5 is a vertical-sectional side view showing the neighborhood of the connector of the wiper blade apparatus shown in FIG. 4.
Figure 6:
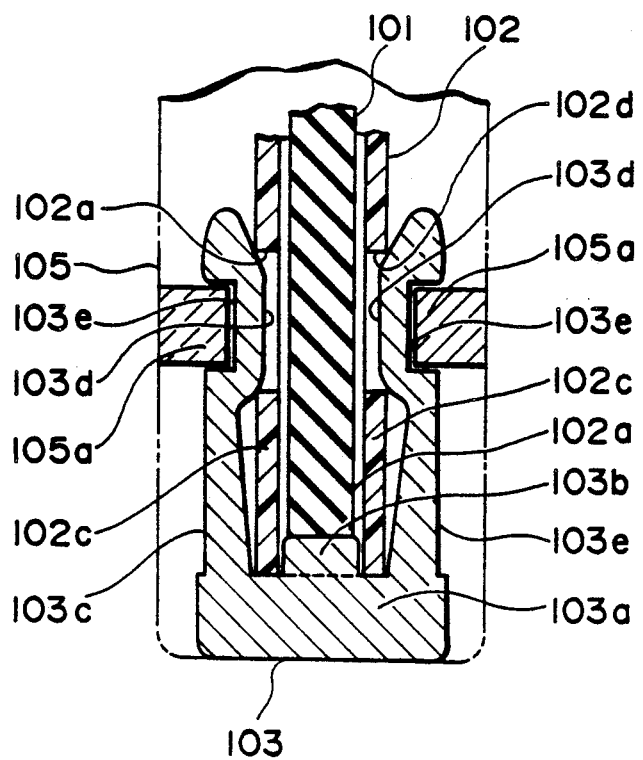
FIG. 6 is a transverse-sectional plan view showing the neighborhood of the connector of the wiper blade apparatus shown in FIG. 4.

In a wiper blade apparatus 1 shown in the Figures, a blade rubber 2 in contact with a wiped surface (not shown) is inserted into a vertebra 3, and a connector 4 is engaged with the vertebra 3 and attached to the yoke 5 fitted to a blade lever L in the same manner as shown in FIG. 4.

Figure 2:
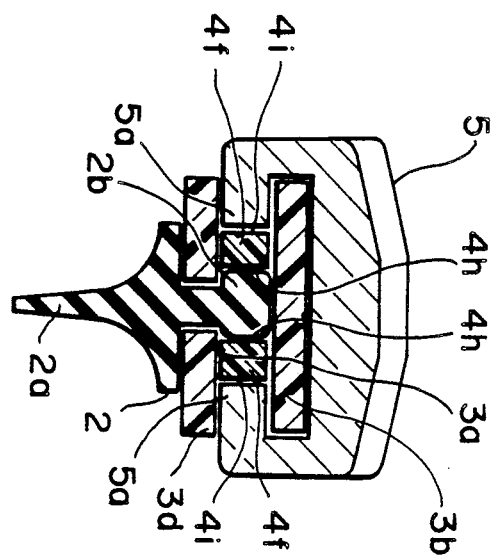
FIG. 2 is a virtical-sectional side view showing the neighborhood of the blade rubber holder of the connector in the wiper blade apparatus shown in FIG. 1.

The blade rubber 2 is provided with along shaped contact portion 2a in contact with the wiped surface (not shown) on a windshield or the like, and an insert portion 2b to be inserted into the vertebra 3 having a T-shaped cross section on the upper side of said contact portion 2a in FIG. 2.

The vertebra 3 is provided with a hollow portion 3a for inserting the insert portion 2b of the blade rubber 2 and an upper plate 3b on the upper side of said hollow portion 3a in FIG. 2, and a lower plate 3d formed with a notch 3c by cutting off the vertebra 3 in the longitudinal direction on the lower side of the hollow portion 3a.

Figure 1:
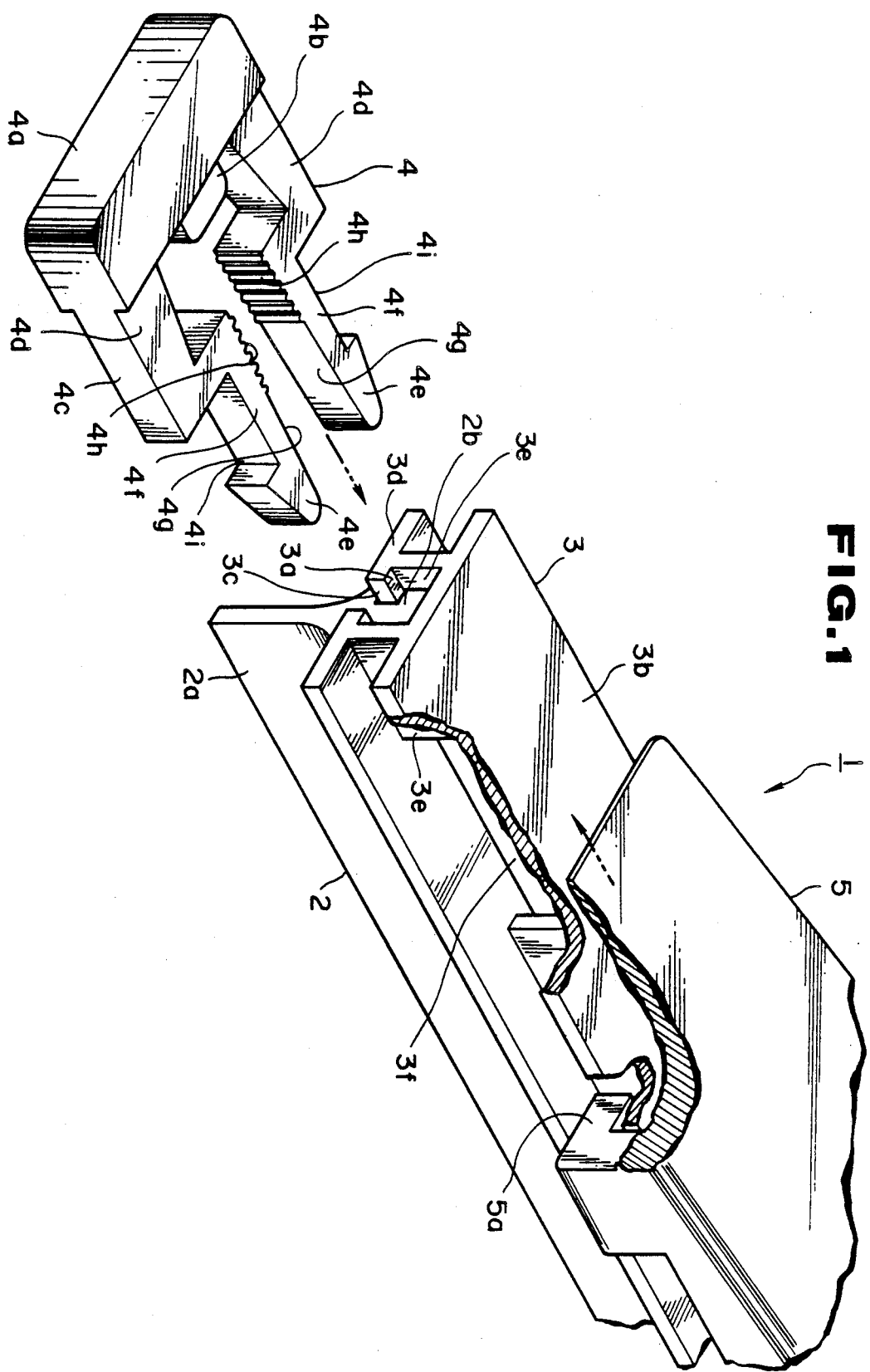
FIG. 1 is a perspective view illustrating the assembling reltation of respective parts at the end of the wiper blade apparatus according to an embodiment of the invention.
Figure 3:
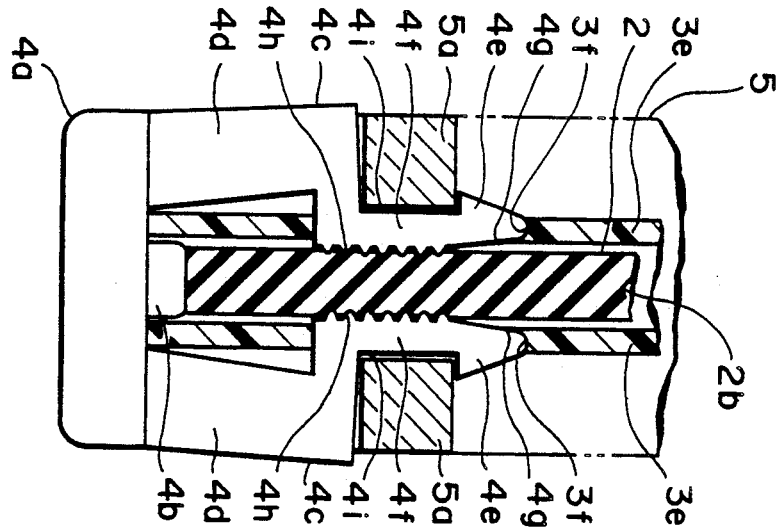
FIG. 3 is a transverse-sectional plan view showing the neighborhood of the connector of the wiper blade apparatus shown in FIG. 1.

Additionally, said vertebra 3 has a little elasticity in the direction intersecting the longitudinal direction of the vertebra 3 at right angles, and is provided with openings 3f pierced in the horizontal direction in FIG. 3 in positions near to both ends of connecting plates 3e, 3e provided between said upper plate 3b and the lower plate 3d as shown in FIG. 1 (hereupon, only one end is shown between both ends.)

One side, the connector 4 is provided with a rectangular prism shaped base 4a on the lower side in FIG. 3, and with projection 4b slightly extruding upwardly from said base 4a in FIG. 3 and having an external shape which may fit into the hollow portion 3a provided to said vertebra 3.

Said base 4a is provided with crank-like shaped arms 4c, 4c protruding upwardly from both sides of the projection 4b respectively in FIG. 3, and respective arms 4c, 4c have a little elasticity in the right and left direction in FIG. 3.

Additionally, said arms 4c have outer arms 4d, 4d and inner arms 4e, 4e connected in a crank like shape, and are provided to said inner arms 4e, 4e with blade rubber holders 4f, 4f which are engaged with said vertebra 3 and the blade rubber 2 respectively at a state in which the connector 4 is attached to the yoke 5 described later.

Said blade rubber holders 4f, 4f are provided with fitting pieces 4g, 4g for engaging said connector 4 with the vertebra 3 by fitting respectively into the openings 3f,3f provided to the connecting plate 3e, 3e of said vertebra 3, serrated walls 4h, 4h which extrudes inwardly from said fitting pieces 4g, 4g in a saw-toothed shape and is engaged respectively with the insert portion 2b of the vertebra 3, and fitting grooves 4i, 4i which are hollow inwardly from respective outer periphery of the inner arms 4e and slightly press the inner arms 4e inwardly by attaching the yoke 5 described later.

The other side, in the same manner as shown in FIG. 4, the yoke 5 is provided to one end thereof near to either end of the vertebra 3 with engaging parts 5a, 5a to be engaged with connector 4 stretched inwardly corresponding to the openings 3f provided to the connecting plate 3e from the side of the upper plate 3b of the vertebra 3. And the yoke 5 is so designed as to slightly press the inner arms 4e of the connector 4 inwardly by fitting said engaging parts 5a, 5a into the fitting groves 4i, 4i provided to said connector 4 respectively, Namely, the insert portion 2b provided to the blade rubber 2 is inserted into the hollow portion 3a provided to the vertebra 3, and the fitting pieces 4g, 4g provided to the inner arms 4e, 4e of the connector 4 are fitted into the openings 3f, 3f provided to the connecting plates 3e, 3e of said vertebra 3 respectively, subsequently the engaging parts 5a, 5a provided to the yoke 5 are fitted into the fitting groves 4i, 4i provided to the inner arms 4e, 4e of the connector 4, respectively, Hereby, since the inner arms 4e, 4e of the connector 4 are slightly pressed and move inwardly, the blade rubber 2 is held by engaging the serrated walls 4h, 4h of the blade rubber holders 4f, 4f provided to the connector 4 with the blade rubber 2 respectively, and the vertebra 3 and the yoke 5 are engaged with the blade rubber 2 by connector 4.

As described above, the wiper blade apparatus according to this invention has a blade rubber in contact with a wiped surface, a vertebra holding said blade rubber, a yoke fitted to a lever, and a connector attached to said yoke in an engaged state with said vertebra, said connector is provided with a blade rubber holder for engaging with the vertebra and the blade rubber at a state in which the connector is attached to the yoke. Therefore, by using the wiper blade apparatus, it is possible to hold the blade rubber to the yoke very securely because the blade rubber is never disconnected from the vertebra different from the conventional type.

Accordingly, an excellent effect is obtained since it is able to keep the field of view in favorable state for a long time in case of wiping the wiped surface.

What is claimed is:

1. A wiper blade assembly comprising:
   at least one yoke adapted to be connected to a lever carried by a wiper arm;
   vertebra means carried by said yoke;
   a rubber blade adapted to be disposed in contact with a surface to be wiped slidably supported on aid vertebra means; and
   connector means having a pair of arms detachably connected to said yoke and said vertebra means at a common connecting point and having serrated blade engaging means on said arms at said common connecting point engaging opposite sides of said rubber blade when pressed inwardly toward said rubber blade by said yoke to secure said rubber blade, said yoke and said vertebra means together at said common point.

2. A wiper blade assembly as set forth in claim 1, wherein said vertebra means is provided with connecting plates having openings at said common point disposed on opposite sides of said blade and said arms are provided with projecting portions detachably located in said openings.

3. A wiper blade assembly as set forth in claim 2, wherein said projecting portions of said arms ar each provided on an outer side thereof with an outwardly opening groove for receiving engaging portions of said yoke and on an inner side thereof with said serrated blade engaging means.

* * * * *